(12) United States Patent
Richard

(10) Patent No.: US 6,759,945 B2
(45) Date of Patent: Jul. 6, 2004

(54) VARIABLE TRANSMITTANCE BIREFRINGENT DEVICE

(75) Inventor: David A. Richard, Mexico, MO (US)

(73) Assignee: VTEC Technologies, Inc., Chestnut Hill, MA (US)

( * ) Notice: Subject to any disclaimer, the term of this patent is extended or adjusted under 35 U.S.C. 154(b) by 138 days.

(21) Appl. No.: 09/821,667

(22) Filed: Mar. 29, 2001

(65) Prior Publication Data
US 2002/0140884 A1 Oct. 3, 2002

(51) Int. Cl.[7] .................. G02F 1/1335; C09K 19/02
(52) U.S. Cl. ................. 340/179; 349/184; 349/101; 349/76
(58) Field of Search .................. 349/179, 184, 349/101, 76, 195

(56) References Cited

U.S. PATENT DOCUMENTS

| | | |
|---|---|---|
| 3,612,654 A | 10/1971 | Klein et al. |
| 3,614,210 A | 10/1971 | Caplan |
| 3,731,986 A | 5/1973 | Fergason |
| 3,814,501 A | 6/1974 | Schindler |
| 3,837,729 A | 9/1974 | Harsch |
| 3,862,798 A | 1/1975 | Hopkins |
| 4,146,656 A | 3/1979 | Kinugawa et al. |
| 4,200,361 A | 4/1980 | Malvano et al. |
| 4,299,444 A | 11/1981 | Romer |
| 4,443,057 A | 4/1984 | Bauer et al. |
| 4,540,243 A | 9/1985 | Fergason |
| 4,575,849 A | 3/1986 | Chun |
| 4,580,875 A | 4/1986 | Bechtel et al. |
| 4,589,735 A | 5/1986 | Saunders |
| 4,603,946 A | 8/1986 | Kato et al. |
| 4,620,113 A | 10/1986 | Sizer, II et al. |
| 4,655,549 A | 4/1987 | Suzuki et al. |
| 4,660,937 A | 4/1987 | Richardson |

(List continued on next page.)

FOREIGN PATENT DOCUMENTS

| | | | |
|---|---|---|---|
| JP | 355149921 | * | 11/1980 |
| WO | WO9946211 A1 | * | 9/1999 |

Primary Examiner—Robert H. Kim
Assistant Examiner—Hoan C. guyen

(57) ABSTRACT

A variable reflectance mirror employing a super-twisted nematic (STN) liquid crystal cell to control reflectivity. The STN liquid crystal cell includes a layer of STN liquid crystal material formed between a pair of transparent electrodes, where a polymer alignment layer is formed over the electrodes so as to orient the STN liquid crystal material to possess a twist angle between approximately 180° and approximately 270°. A pair of crossed polarizers are respectively positioned on the outer surfaces of the front and rear plates. A layer of reflective material is further formed adjacent to the outer surface of the polarizer adjacent to the rear plate. The transparent electrodes are connected to a voltage source to apply an electrical bias across the STN liquid crystal layer, where the transmitivity of the STN liquid crystal layer to light can be varied by varying the electrical bias applied across the transparent electrodes to vary the birefringence of the STN liquid crystal layer. The degree of reflection provided by the variable reflectance mirror is adjusted by adjusting the electrical bias applied across the STN liquid crystal layer. A stacked IC control circuit is provided for controlling the electrical bias applied across the STN liquid crystal layer.

4 Claims, 4 Drawing Sheets

U.S. PATENT DOCUMENTS

| | | | |
|---|---|---|---|
| 4,669,825 A | 6/1987 | Itoh et al. | |
| 4,669,827 A | 6/1987 | Fukada et al. | |
| 4,671,615 A | 6/1987 | Fukada et al. | |
| 4,676,601 A | 6/1987 | Itoh et al. | |
| 4,678,281 A | 7/1987 | Bauer | |
| 4,690,508 A | 9/1987 | Jacob | |
| 4,697,883 A | 10/1987 | Suzuki et al. | |
| 4,712,879 A | 12/1987 | Lynam et al. | |
| 4,715,686 A * | 12/1987 | Iwashita et al. | 350/339 |
| 4,729,638 A | 3/1988 | Shirai | |
| 4,793,690 A | 12/1988 | Gahan et al. | |
| 4,799,768 A * | 1/1989 | Gahan | 350/279 |
| 4,896,030 A | 1/1990 | Miyaji | |
| 4,902,108 A | 2/1990 | Byker | |
| 4,917,477 A | 4/1990 | Bechtel et al. | |
| 5,082,601 A * | 1/1992 | Okada et al. | 252/585 |
| 5,110,637 A * | 5/1992 | Ando et al. | 428/34 |
| 5,111,629 A * | 5/1992 | Baughman et al. | 52/171 |
| 5,122,647 A | 6/1992 | Lynam et al. | |
| 5,128,799 A | 7/1992 | Byker | |
| 5,130,528 A | 7/1992 | Phillips, Jr. | |
| 5,148,014 A | 9/1992 | Lynam et al. | |
| 5,168,378 A | 12/1992 | Black et al. | |
| 5,193,029 A | 3/1993 | Schofield et al. | |
| 5,202,787 A | 4/1993 | Byker et al. | |
| 5,233,461 A | 8/1993 | Dornan et al. | |
| 5,239,405 A | 8/1993 | Varaprasad et al. | |
| 5,253,109 A | 10/1993 | O'Farrell et al. | |
| 5,267,067 A | 11/1993 | Wiget | |
| 5,282,077 A | 1/1994 | Byker | |
| 5,285,060 A | 2/1994 | Larson et al. | |
| 5,303,020 A | 4/1994 | Croteau | |
| 5,373,392 A | 12/1994 | Bala | |
| 5,406,414 A | 4/1995 | O'Farrell et al. | |
| 5,416,313 A | 5/1995 | Larson et al. | |
| 5,424,865 A | 6/1995 | Lynam | |
| 5,469,296 A * | 11/1995 | Ohno et al. | 359/603 |
| 5,481,395 A | 1/1996 | Byker | |
| 5,486,952 A | 1/1996 | Nagao et al. | |
| 5,500,760 A | 3/1996 | Varaprasad et al. | |
| 5,528,414 A | 6/1996 | Oakley | |
| 5,530,240 A | 6/1996 | Larson et al. | |
| 5,541,762 A | 7/1996 | Levy | |
| 5,550,677 A | 8/1996 | Schofield et al. | |
| 5,581,406 A | 12/1996 | Kobayashi et al. | |
| 5,585,735 A | 12/1996 | Takahashi et al. | |
| 5,611,966 A | 3/1997 | Varaprasad et al. | |
| 5,642,236 A | 6/1997 | Mazurek | |
| 5,659,423 A | 8/1997 | Schierbeek et al. | |
| 5,668,663 A | 9/1997 | Varaprasad et al. | |
| 5,675,438 A | 10/1997 | Nagao et al. | |
| 5,686,979 A * | 11/1997 | Weber et al. | 349/96 |
| 5,715,093 A | 2/1998 | Schierbeek et al. | |
| 5,751,467 A | 5/1998 | Byker | |
| 5,760,962 A | 6/1998 | Schofield et al. | |
| 5,801,873 A | 9/1998 | Byker | |
| 5,805,330 A | 9/1998 | Byker et al. | |
| 5,808,778 A | 9/1998 | Bauer et al. | |
| 5,883,605 A | 3/1999 | Knapp | |
| 5,910,854 A | 6/1999 | Varaprasad et al. | |
| 5,976,511 A * | 11/1999 | Ohtsu et al. | 424/59 |
| 6,002,511 A | 12/1999 | Varaprasad et al. | |
| 6,016,215 A | 1/2000 | Byker | |
| 6,039,390 A | 3/2000 | Agrawal et al. | |
| 6,057,956 A | 5/2000 | Ash et al. | |
| 6,074,066 A | 6/2000 | Macher et al. | |
| 6,084,700 A | 7/2000 | Knapp et al. | |
| 6,084,702 A | 7/2000 | Byker et al. | |
| 6,094,290 A | 7/2000 | Crawford et al. | |
| 6,099,131 A | 8/2000 | Fletcher et al. | |
| 6,143,209 A | 11/2000 | Lynam | |
| 6,154,306 A | 11/2000 | Varaprasad et al. | |
| 6,157,480 A | 12/2000 | Anderson et al. | |
| D441,703 S | 5/2001 | Rumsey et al. | |
| 6,376,695 B1 * | 4/2002 | Kushibiki et al. | 556/413 |

* cited by examiner

VARIABLE TRANSMITTANCE BIREFRINGENT DEVICE

BACKGROUND OF THE INVENTION

1. Field of the Invention

The present invention relates generally to a variable transmittance birefringent device, and specifically to a variable reflectance vehicle mirror which electrically controls reflectivity thereof by use of a birefringent medium.

2. Description of Related Art

A familiar hazard for the driver of a vehicle that is being 'blinded' by the glare of light beams from the headlights of a following vehicle, such beams being reflected by the rearview mirror of the driver's vehicle. In order to avoid this glare, prismatic rearview mirrors are used in the interior of a vehicle which can be switched from a high to a low reflecting state by use of a manual lever located on the mirror. Under ordinary driving conditions, the high reflecting state of the mirror is used to provide optimal rear visibility. At night, the interior mirror is often switched to its low reflecting state to prevent the driver from being blinded by the headlights of following vehicles. The low reflectivity state of the mirror typically exhibits non-spectral selectivity, where the background of an image viewed in the low reflectivity state of the prismatic mirror would be color neutral.

With the advent of electro-optic technology, it has become possible to achieve continuous variability in reflectivity in rearview mirrors for motor vehicles. This variability has been achieved, for example, through the use of electrochromic devices, wherein the intensity of light is modulated by passing the light through an electrochromic (EC) cell. Electrochromism describes materials which change color when their composition is changed by use of an electrochemical cell, which enables the materials to be reversibly colored or bleached. In such devices, the EC cell includes an electrochromic medium disposed between two conductive electrodes which undergoes Electrochromism when potential differences are applied across the two electrodes. Antiglare mirrors for use in vehicles using a solution-phase or gel-type EC cell and thin-film type EC cell have been conventionally proposed. The solution-phase or gel-type EC cell, which is formed of a liquid or gel material such as biologen compound sealed between glass substrates, uses coloring due to oxidation/reduction of the biologen compound when a voltage is applied to the glass substrates. The thin-film type EC cell, which is formed of a transient metal oxide such as $WO_3$ vapor-deposited on the glass substrates, uses coloring due to injection of hydrogen and metal ions into and emission thereof when a voltage is applied to the glass substrates. Therefore, whether the anti-glare mirror uses the solution phase type EC, the gel-type EC or the thin-film type EC cell, as the applied voltage becomes high, its mirror reflectivity decreases due to the coloring of the EC cell, and when the applied voltage is removed, the reflectivity is restored to its initial value.

Mirrors employing EC cells have several drawbacks. In order to provide a rapid change in intensity and uniformity in the coloring of the EC cell, very large electrical contacts extending substantially along the entire length of the top and bottom surfaces of the mirror are required. Thus, these mirrors require bevels or rims to cover and insulate these electrical contacts, which increase the size, cost, and complexity of the mirrors. Furthermore, use of a gel-type or solution-phase EC cell is undesirable due to the likelihood of the electrochromic medium leaking out of mirror should the mirror become damaged. The leakage of the electrochromic medium can not only be dangerous to passengers in the vehicle who are exposed to the electrochromic medium, but leakage of the electrochromic medium can further render the mirror non-functional. The constituency of the EC cell is damaging to the interior dashboard and exterior finish of the vehicles on which they are mounted should the mirror become cracked or the cell ruptured by impact or collision causing the contents to leak out. Electrochromic devices may also exhibit deleterious performance when exposed to ultraviolet radiation over prolonged periods of time, which may be linked to a variety of sources including a potential propensity for photochromism to occur.

Vehicles are typically equipped with an interior rearview mirror as well as exterior mirrors outside of the driver and passenger doors. In order to prevent the driver from being subjected to a glare from rearward light reflected from any of these mirrors, each of the mirrors must have a controlled reflectivity. In current systems having mirrors possessing EC cells, it is known to utilize a singular drive circuit to control all of the mirrors. This drive circuit is typically housed with the interior mirror, requiring a dedicated wire harness and specific input voltage to control and activate the EC cells on the exterior mirrors of the vehicle. All of the EC cells within the system are uniformly activated by the drive circuit, even when the dazzle or glare is only coming from one of the mirrors. This uniform activation of all of the mirrors unnecessarily reduces the image quality of the other mirrors where no dazzle or vision impairing is present.

Mirrors are also known which make use of the properties of nematic liquid crystals which are normally transparent to light but which when subjected to a sufficient electrical voltage beyond a certain threshold, present a state of turbulence so that the light is attenuated to an increasing degree as the applied electric field is increased. Upon suppressing the applied electric field, the liquid crystal returns to the transparent state. Using such mirrors, therefore, it is possible to obtain selectively a high or a low reflecting power, according to whether the electrical voltage acting on the liquid crystal is lower or greater than said threshold. The chief drawback of conventional liquid crystal mirrors is that when the mirrors work in conditions of weak reflecting power the images of objects viewed by reflection in the mirror are considerably dimmed. In these types of liquid crystal mirrors, either Chromium or Rhodium plated or deposited surfaces are used as the reflective medium. These mediums offer only a 50 to 55% reflectivity in the visible wavelengths, thus reducing the image brightness even in the non-activated state.

Some examples of these prior art liquid crystal mirrors are described in U.S. Pat. No. 3,862,798 issued to Hopkins and U.S. Pat. No. 4,200,361 issued to Malvano. These patents describe nematic liquid crystal devices having a liquid crystal film sandwiched between front and rear transparent electrode surfaces, where the nematic liquid crystal mirrors of these types are typically only capable of transmitting 50% of available light. With the standard 3% loss of transmission between the air to substrate interface and the fact that the light, in reflection, must travel back through the devise, there is an additional 6% loss of transmission, not with standing the liquid crystal film absorption. This rendered mirrors employing typical liquid crystal cells capable of, at best, 44% transmission of the incident light. This phenomenon directly resulted from the use of uncompensated-for polarized light in the reflective devise. Aside from typically exhibiting poor reflectivity, mirrors employing conventional liquid crystal materials have also generally suffered from having an insufficient viewing angle, low contrast ratios, and variable response times with temperature fluctuation.

SUMMARY OF THE INVENTION

The foregoing shortcomings and disadvantages of the prior art are alleviated by the present invention that provides a variable reflectance mirror employing a super-twisted nematic (STN) liquid crystal cell to control reflectivity. The STN liquid crystal cell includes a pair of transparent electrically insulating plates serving as front and rear plates for the liquid crystal cell, where these plates may comprise glass or an optical grade, stable synthetic plastic. The facing surfaces of each of these plates are coated with a transparent metal oxide film, which acts as an electrode. A layer of STN liquid crystal material is formed in the area between the electrodes, where a polymer alignment layer is formed over the conductive layers and in contact with the STN liquid crystal material. The alignment layer is treated in a way so as to orient the STN liquid crystal material to possess a twist angle between approximately 180° and approximately 270°. A pair of crossed polarizers are respectively positioned on the outer surfaces of the front and rear plates. A layer of reflective material is further formed adjacent to the outer surface of the polarizer adjacent to the rear plate, where the reflective layer is affixed to the rear polarizer by a bonding layer. The variable reflectance mirror includes a front transparent cover element which is affixed to the front polarizer by a bonding layer and a rear transparent cover element positioned adjacent to the reflective layer, wherein the front and rear transparent cover elements form the outer surfaces of the mirror.

The conductive layers are connected to a voltage source to apply an electrical bias to the STN liquid crystal layer, where the transmitivity of the STN liquid crystal layer to light can be varied by varying the electrical bias applied across the conductive layers. When little or no voltage is applied across the conductive layers, the liquid crystal layer is essentially transparent to light. As a voltage is applied across the transparent electrodes, the twist angle of the STN liquid crystal layer changes to make the layer more opaque and to scatter light. The degree of opaqueness achieved in the STN liquid crystal layer is proportional to the amount of voltage applied across the transparent electrodes. The degree of reflection provided by the variable reflectance mirror is adjusted by adjusting the electrical bias applied across the STN liquid crystal layer.

A control circuit is connected to the STN liquid crystal cell to control the electrical bias applied across the STN liquid crystal layer. A rear light detecting sensor and an ambient light detecting sensor are further connected to the control circuit for determining the intensity of the light impinging on the variable reflectance mirror from the rear of the vehicle. The control circuit adjusts the reflectivity of the variable reflectance mirror based upon the intensity of the light measurements made by the rear light detecting sensor and an ambient light detecting sensor.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a variable reflectance vehicle mirror.

Figure 1:
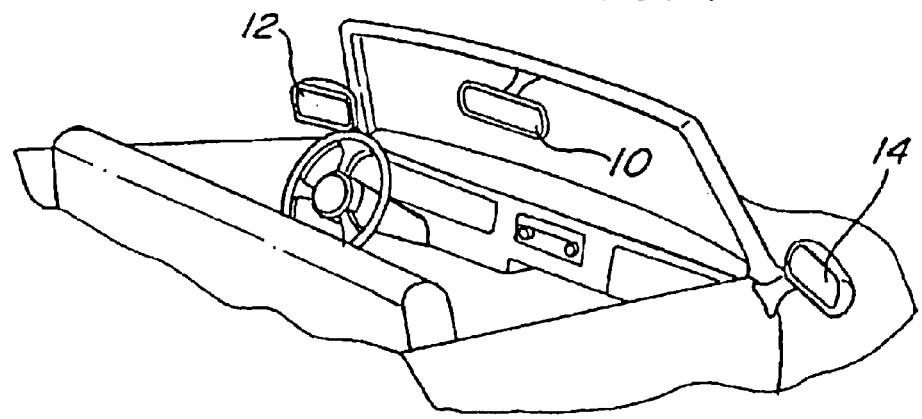
FIG. 1 is a perspective view of a vehicle showing the arrangement of rearview mirrors on the vehicle.

The present invention is directed toward a variable transmittance birefringent device and, more particularly, to an independently-driven variable reflectance vehicle mirror which utilizes a birefringent medium to a continuous range of reflectivity. As illustrated in FIG. 1, the variable reflectance mirror of the present invention may be utilized as the internal rearview mirror 10 or the external mirrors 12 and 14 respectively positioned outside the driver and passenger doors of a vehicle. While the discussion of the present invention will focus upon the variable reflectance mirror being utilized in a vehicle, it is not the intention of the inventor of the present invention to limit its use to within vehicles and the variable reflectance mirror of the present invention may be utilized for other types of mirrors where attenuation of the reflectivity of the mirror is desired.

Figure 2:
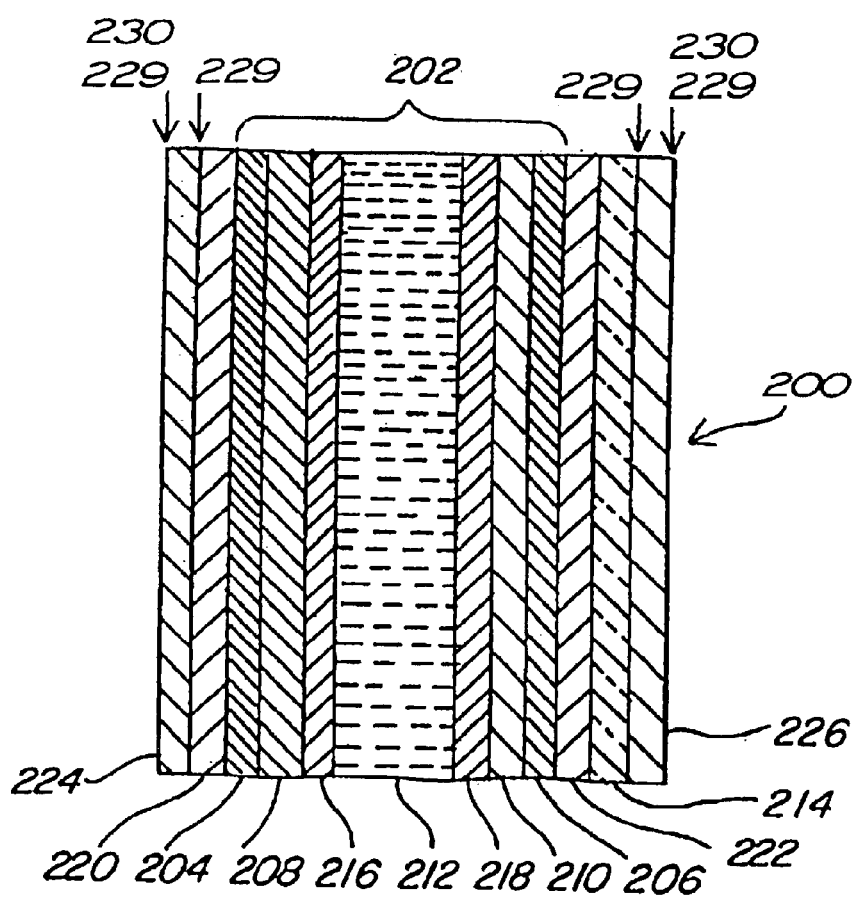
FIG. 2 is a cross-sectional view of a preferred embodiment of the variable reflectance mirror of the present invention.

Referring now to FIG. 2, a cross-sectional view of a variable reflectance mirror 200 formed in accordance with a preferred embodiment of the present invention is illustrated. The mirror employs a super-twisted nematic liquid crystal cell 202 to control the transmittance of light there through and, in turn, the reflectivity of the mirror. The liquid crystal cell 202 includes a pair of transparent electrically insulating plates 204 and 206 respectively serving as front and rear plates for the liquid crystal cell 202. Plates 204 and 206 may comprise glass, an optical grade, stable synthetic plastic, or other suitable optically transmissive medium. A pair of transparent electrodes 208 and 210 are respectively formed on the facing surfaces of plates 208 and 210, where transparent electrodes 208 and 210 are preferably a transparent metal oxide film, such as indium-tin-oxide (ITO) or other similar metal oxide conductive layers. Transparent electrodes 208 and 210 may be formed as a solid layer, or may alternatively be patterned, such as to form rows and columns as in a passive matrix display or to form individual pixels as in an active matrix display.

A layer of super-twisted nematic liquid crystal material 212 is formed in an area between the transparent electrodes 208 and 210. The transparent electrodes 208 and 210 are connected to a voltage source for applying an electrical bias across the liquid crystal layer 212. The transmitivity of the liquid crystal layer 212 to light can be varied by varying the electrical bias applied across the transparent electrodes 208 and 210. When little or no voltage is applied across the transparent electrodes 208 and 210, the liquid crystal layer 212 is essentially transparent to light. As a voltage is applied across the transparent electrodes 208 and 210, the liquid crystal layer 212 becomes more opaque and scatters light. The degree of opaqueness achieved in the liquid crystal layer 212 is proportional to the amount of voltage applied across the transparent electrodes 208 and 210. Light entering the variable reflectance mirror 200 passes through the liquid crystal layer 212 until it reaches a reflecting layer 214 which reflects the light back through the liquid crystal layer 212 toward a viewer. Thus, the degree of reflection provided by the variable reflectance mirror 200 is adjusted by varying the electrical bias applied across the liquid crystal layer 212.

The liquid crystal cell 202 includes polymer alignment layers 216 and 218 formed over the transparent electrodes 208 and 210 and in contact with the liquid crystal layer 212. The alignment layers 216 and 218 are treated in a way so as to orient the liquid crystal molecules in the liquid crystal layer 212 to a desired orientation. The alignment or orientation of the liquid crystal molecules occurs along a preferred direction, e.g. introduced by rubbing of an orientation layer, and at a certain angle with respect to the plane of the inside of the two transparent plates 204 and 206 which support the transparent electrodes 208 and 210. This latter angle is referred to as the tilt angle. The alignment layers 216 and 218 undergo a rubbing process which leaves a series of parallel microscopic grooves in the alignment layers 216 and 218. These grooves help align the liquid crystal molecules in a preferred direction, with their longitudinal axes parallel to the grooves. This anchors the liquid crystal molecules along the alignment layers 216 and 218 and helps to force the molecules between the alignment layers to twist. After rubbing both alignment layers 216 and 218, they are rotated by a certain angle around the axis perpendicular to the main plane in order to establish the so called twist angle of the liquid crystal molecules between the alignment layers 216 and 218. The alignment layers 216 and 218 may be applied in any number of ways, including but not limited to solution casting, e.g. spin coating, roller coating, dipping, spraying, printing and/or doctor blading, of the appropriate polymer or its precursor. After removal of the solvents and/or curing of the polymer layers, the alignment layers 216 and 218 are usually rubbed or buffed in one direction with cloths.

Figure 3:
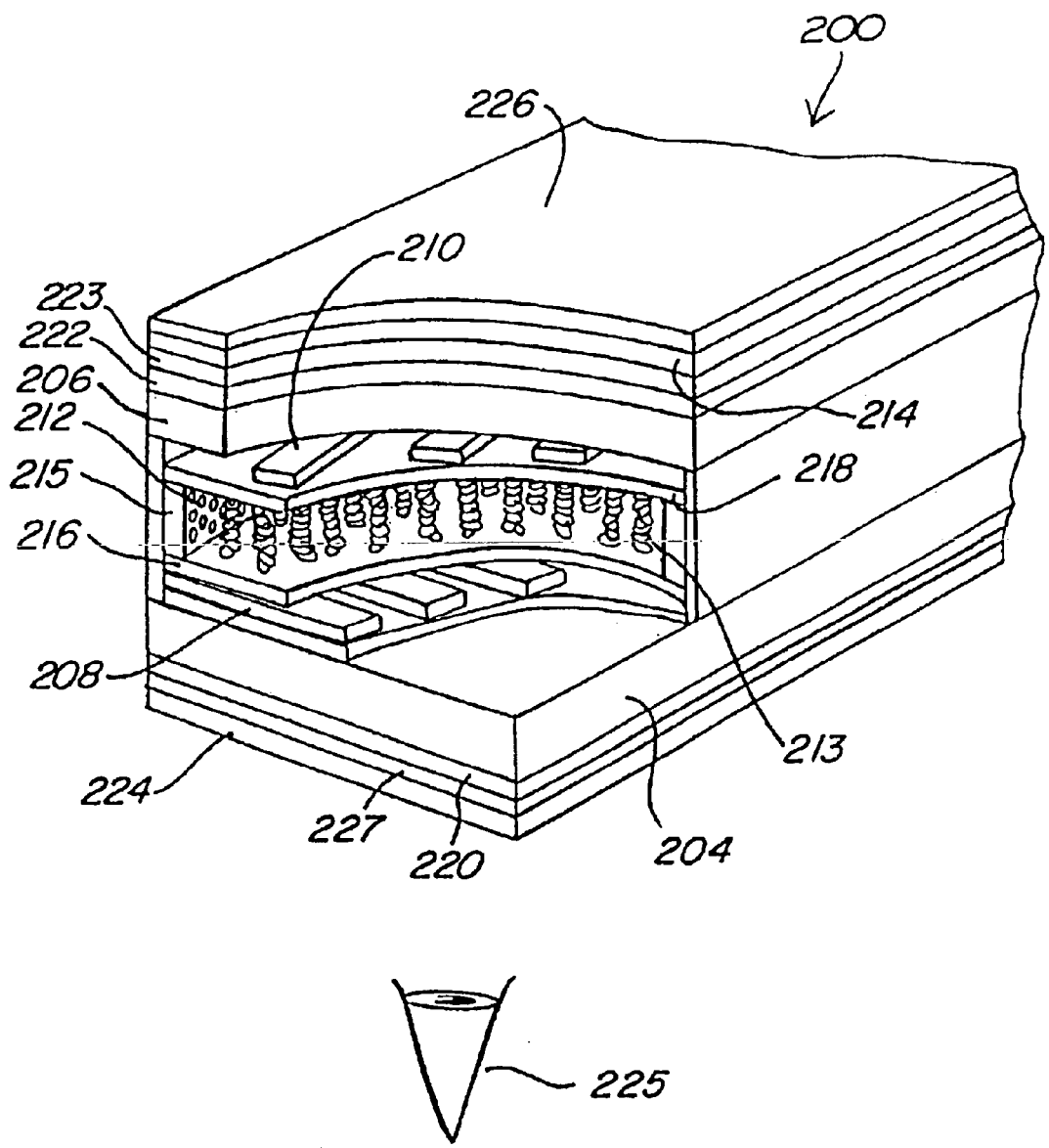
FIG. 3 is a partial cutaway perspective view of a preferred embodiment of the variable reflectance mirror of the present invention.

In order to form the liquid crystal cell 202, the transparent plates 204 and 206 are adhered together around their periphery using a conventional adhesive for forming liquid crystal displays, e.g. using organic adhesives. In order to preserve a constant thickness of the space or gap between the transparent plates 204 and 206, suitable spacers 215 may be positioned in the frame adhesive and/or over the entire opposing surfaces of the transparent plates 204 and 206, as shown in FIG. 3. The gap between the transparent plates 204 and 206 is filled with a super-twisted nematic (STN) liquid crystal material and finally sealed using a similar organic adhesive as the frame adhesive. It is also possible to include suspended spacing spheres 213 in the STN liquid crystal material to assist in maintaining a constant thickness in the gap between the transparent plates 204 and 206. At this stage, a pair of crossed polarizers 220 and 222 are attached to the outer surfaces of the transparent plates 204 and 206, where the operation of the crossed polarizers in conjunction with the STN liquid crystal cell 202 will be described in greater detail hereinbelow. Electrical connections are made to the transparent electrodes 208 and 210 in a manner consistent with known liquid crystal display designs. The layer of reflective material 214 is further formed on the outer (posterior) surface of the polarizer 222 adjacent to the rear plate 206. The reflective layer 214 is preferably an enhanced aluminum material or other similar highly reflective material. A layer of bonding material 223 affixes the reflective layer 214 to the rear polarizer 222. The bonding layer 223 may comprise an optically clear aliphatic iscocynate or a cynoacrylate material or other similar transparent bonding material.

Referring now to FIG. 3, a partial cutaway perspective view of the variable reflectance mirror 200 incorporating the STN liquid crystal cell 202 is shown. The variable reflectance mirror further includes anterior outer panel 224 and posterior outer panel 226, where the anterior side of the variable reflectance mirror 200 is that facing a viewer 225. The outer panels 224 and 226 preferably comprise glass or a polymer having optical characteristics similar to glass, where the polymer may include but is not limited to acrylic (PMMA), polycarbonate, cyclic olefins, styrene, acrylic/styrene, CR-39® (PPG Industries), acetate, polyvinyl buterate, or polyurethane. A layer of bonding material 227 similar to bonding layer 223 affixes the anterior outer panel 224 to the front polarizer 220. The reflective layer 214 is preferably positioned on the anterior side of the posterior outer panel 226. The character of the outer panels 224 and 226 can be further enhanced through the application of light path and reflectivity enhancing organic or inorganic coatings 229. Such coatings may be applied through a variety of methods, such as but not limited to dipping, spraying, or vacuum deposition. Such coatings may be utilized to enhance the weatherability of the assembly through the application of anti-abrasion and anti-reflective first and second surface coatings. For instance, in order to provide the outer panels 224 and 226 with a sufficient degree of scratch resistivity, the polymer outer panels 224 and 226 may be coated on all surfaces with an abrasion resistant "tie bond" coating that has a base of an organo-silicone (methylpolysiloxane) polymer with a thickness of approximately 2 to 10 microns. The polymer outer panels 224 and 226 may be coated with additional hydrophilic layers 230 of Zirconia and Silicone Dioxide, a typical description of the coating formula would be described as a tiebond "hardcoat" of 2–3 $\mu$M thickness, 2616 angstrom of $SiO_2$, 246 angstrom of $ZrO_2$, 174 angstrom of $SiO_2$, 765 angstrom of $ZrO_2$, 907 angstrom of $SiO_2$. Alternately, an additional layer of hydrophobic acting perfluoroalkylsilane may be added to either or both of the external surfaces of the polymer outer panels 224 and 226 to form a strongly adherent fluorised siloxane coating. The optimal coating thickness for the perfluoroalkylsilane is approximately 5–20 nm.

Each of the polymer outer panels 224 and 226 may further be UV (ultra-violet) stabilized with a UV inhibitors in order to prevent color degradation over time. Typical UV inhibitors which may utilized are as follows: Cyagard 1164L, Cyagard 3638, Cyagard UV 531, Cyagard UV 5411, Cyagard UV 9, Cyasorb 1084, Cyasorb 1164, Cyasorb 284, Cyasorb UV 1988, Cyasorb UV 2098, Cyasorb UV 2126, Cyasorb UV 24, Cyasorb UV 2908, Eastman Inhibitor RMB, Givsorb UV-1, Givsorb UV-2, Givsorb UV-13, Givsorb UV-14, Givsorb UV-15, Givsorb UV-16, Mark 1535, Mark 446, Maxgard 200, Maxgard 800, Norbloc 6000, Norbloc 7966, Quercetin, Sanduvor 3206, Sanduvor EPU, Sanduvor VSU, Seesorb 201, Syntase 1200, TBPE BZT, Tinuvin 99, Tinuvin 109, Tinuvin 1130, Tinuvin 120, Tinuvin 1545, Tinuvin 1577FF, Tinuvin 320, Tinuvin 326, Tinuvin 327, Tinuvin 328, Tinuvin 384, Tinuvin 400, Tinuvin 571, Tinuvin 840, Tinuvin 900, Tinuvin 928, Tinuvin P, Uvinul 3035, Uvinul 3039, Uvinul 3048, Uvinul 400, Uvinul D 49, Uvinul D 50, Uvinul P 25, Uvinul T-150.

The liquid crystal cell 202 of the present invention contains a layer of super-twisted nematic (STN) liquid crystal material 212. Unlike mirrors employing conventional nematic liquid crystal materials which only provide a twist angle of 90° between electrodes, the STN liquid crystal material 212 of the present invention undergoes a greater then 90-degree twist between the transparent electrodes 208 and 210. The transmission axes of the polarizers 222 and 224 are preferably positioned in a direction at an optimized, non-parallel angle with respect to the orientation of the liquid crystal molecules at the surfaces of the liquid crystal layer 212. A significant attribute of this STN liquid crystal cell 202 used in the current invention is the ability of the STN liquid crystal molecules to twist between approximately 180° and approximately 270°, where the preferred twist angle of the STN liquid crystal molecules is 210° which provides a broad transition region enabling full grayscale attenuation. This added rotation of the STN liquid crystal molecules of the present invention over conventional TN cells provides steeper tilt angles of the transparent plates 204 and 206, gives the crystal a much steeper voltage-brightness response curve, and also widens the angle at which the variable reflectance mirror 200 can be viewed before losing contrast. With the sharper response of the present invention, it is possible to achieve higher contrast without requiring increased voltage ratios.

The STN liquid crystal material 212 of the present invention is birefringent due to its anistropic nature, where liquid crystals have two indices of refraction and demonstrate double refraction. When light enters a birefringent material, the light is broken up into the fast (called the ordinary ray) and slow (called the extraordinary ray) components. Because the two components travel at different velocities, the waves get out of phase. When the rays are recombined as they exit the birefringent material, the polarization state of the light has changed because of this phase difference. In the present invention, the STN liquid crystal cell 202 is placed between crossed polarizers 220 and 222 whose transmission axes are aligned at some angle between the fast and slow direction of the STN liquid crystal material 212. Because of the birefringent nature of the STN nematic liquid crystal material 212, the incoming linearly polarized light becomes elliptically polarized. When this light reaches the rear polarizer 222, there is now a component of light that can pass through. As light travels through the STN cell, its polarization rotates with the twist angle of the liquid crystal molecules. The magnitude of the phase difference is determined by the twist angle of the STN liquid crystal material 212 between the crossed polarizers 220 and 222, where the amount of the phase shift determines the intensity of the light which passes through the STN liquid crystal cell 202 to the reflecting layer 214 and which is further reflected back through the STN liquid crystal cell 202.

The STN liquid crystal cell 202 is connected to a control circuit which controls the voltage applied across the STN cell. Depending on the strength of the electric field applied across the STN liquid crystal cell 202, the STN liquid crystal cell 202 can change the twist angle of the liquid crystal molecules and, in turn, the polarization of the light passing through the STN liquid crystal cell 202. Thus, the STN liquid crystal cell 202 can provide full grayscale attenuation of the light passing there through to control reflectivity of the variable reflectance mirror in a continuous range between approximately 28% and 94% of full reflectivity. Due to the standard 3% to 4% loss of transmission between the air to substrate interface and the fact that the light, in reflection, must travel back through the device, there is a minimal 6% to 8% loss of transmission resulting in a maximal reflectivity of 92% to 94%. The variable reflectance mirror 200 is capable of controlling reflectivity to a level below 28%; however, safety standards set the current minimal level of reflectivity at 28%. In the STN liquid crystal cell of the present invention, the cell thickness and the birefringence of the STN liquid crystal constituency are carefully chosen for the present invention to result in a high level of transparency during the rest state.

The performance of liquid crystal devices are measured by their contrast ratio. This is described as the luminance of the bright state divided by the luminance of the dark state. In the ideal liquid crystal cell the luminance of the bright state would be high (transparent) and the luminance of the dark state would be low (black) and this would be true for large percentages of the viewing angles. In the devices employing conventional TN liquid crystal cells, the luminance of the bright state is approximately constant for changing viewing angles while the dark state has a lot of light leakage off axis, resulting in the contrast ratio varying greatly as a function of the viewing angle. In the conventional TN liquid crystal devices, a very steep electro-optic transfer characteristic is required to be able to achieve a suitable contrast ratio for the device where the limit for the contrast ratio for such devices is 64:1. The STN liquid crystal material used in the present invention has much steeper electro-optic transfer characteristics with contrast ratios of up to 480:1.

In an alternative embodiment of the present invention, the variable reflectance mirror 200 of the present invention may be formed to be rimless or bezelless. After the various layers of the variable reflectance mirror 200 are formed together, the layers are then trimmed to form a mirror of a desired peripheral geometry. The layers are preferably trimmed using a water jet process which fuses the outer surfaces of the various layers together as it trims the mirror to provide a weather-resistance seal around the outer periphery of the trimmed mirror. The inventor of the present invention recognizes that it is also possible to utilize other similar methods of trimming the layers to produce the trimmed mirror of the present invention. With this rimless construction, the outer periphery of the mirror only requires two small openings to provide electrical contact with the transparent electrodes 208 and 210 in the STN liquid crystal cell 202. The rimless construction of this embodiment of the present invention provides a lightweight, compact and versatile variable reflectance mirror 200.

Figure 4:
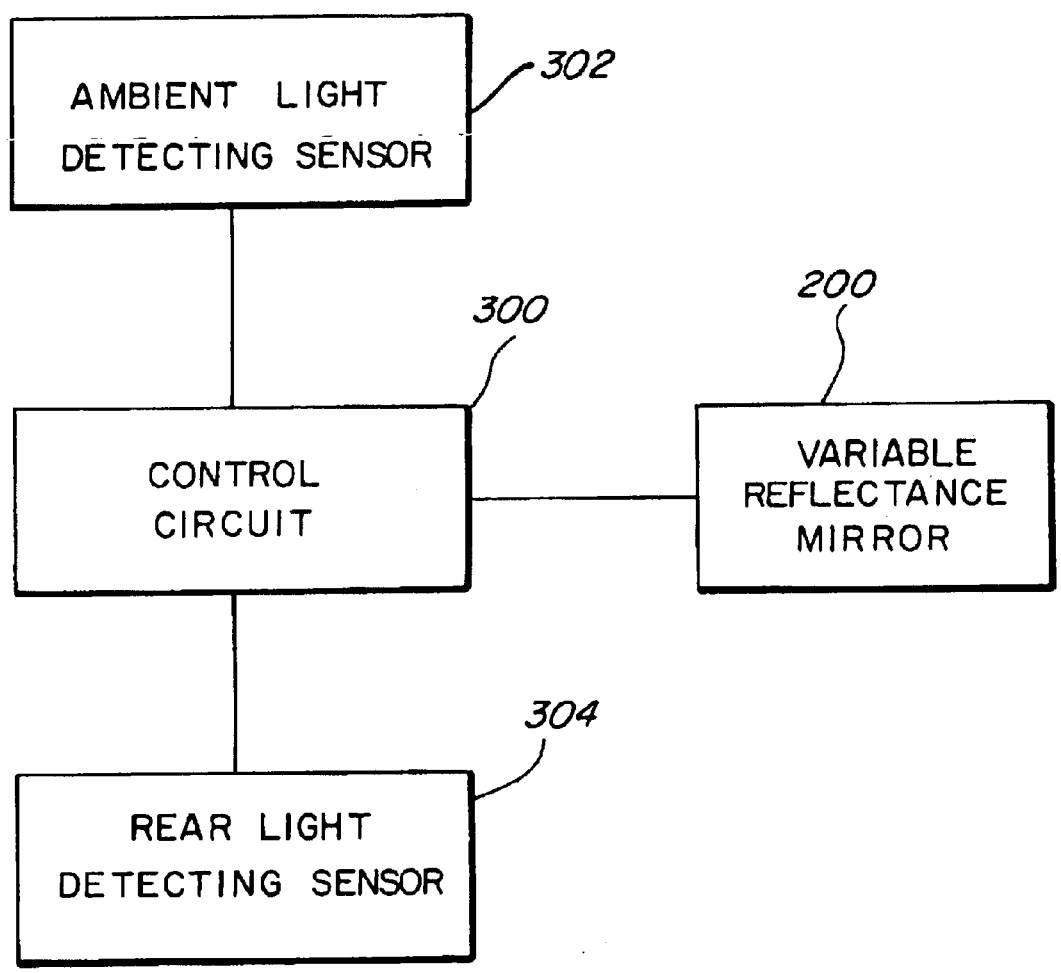
FIG. 4 is a schematic view of the variable reflectance mirror of the present invention and its associated control circuitry.

The variable reflectance mirror 200 includes a control circuit 300 for applying a voltage bias across the transparent electrodes 208 and 210 to control the reflectivity of the mirror 200, as shown in the schematic diagram of FIG. 4. An ambient light detecting sensor 302 detects the external light conditions surrounding the vehicle on which the variable reflectance mirror 200 is installed. The ambient light detecting sensor 302 is preferably disposed on a housing for the mirror and facing a direction other than the rear of the vehicle. A rear light detecting sensor 304 is further provided for detecting the lighting impinging on the variable reflectance mirror 200 from the rear of the vehicle. Based upon the output from the ambient light detecting sensor 302 and the rear light detecting sensor 304, the control circuit 300 determines the required amount of attenuation of reflectivity of the variable reflectance mirror 200 and generates a corresponding voltage bias across the transparent electrodes 208 and 210. The two light detecting sensors 302 and 304 possess independent, non-interactive, responses to the control circuit 300.

Figure 5:
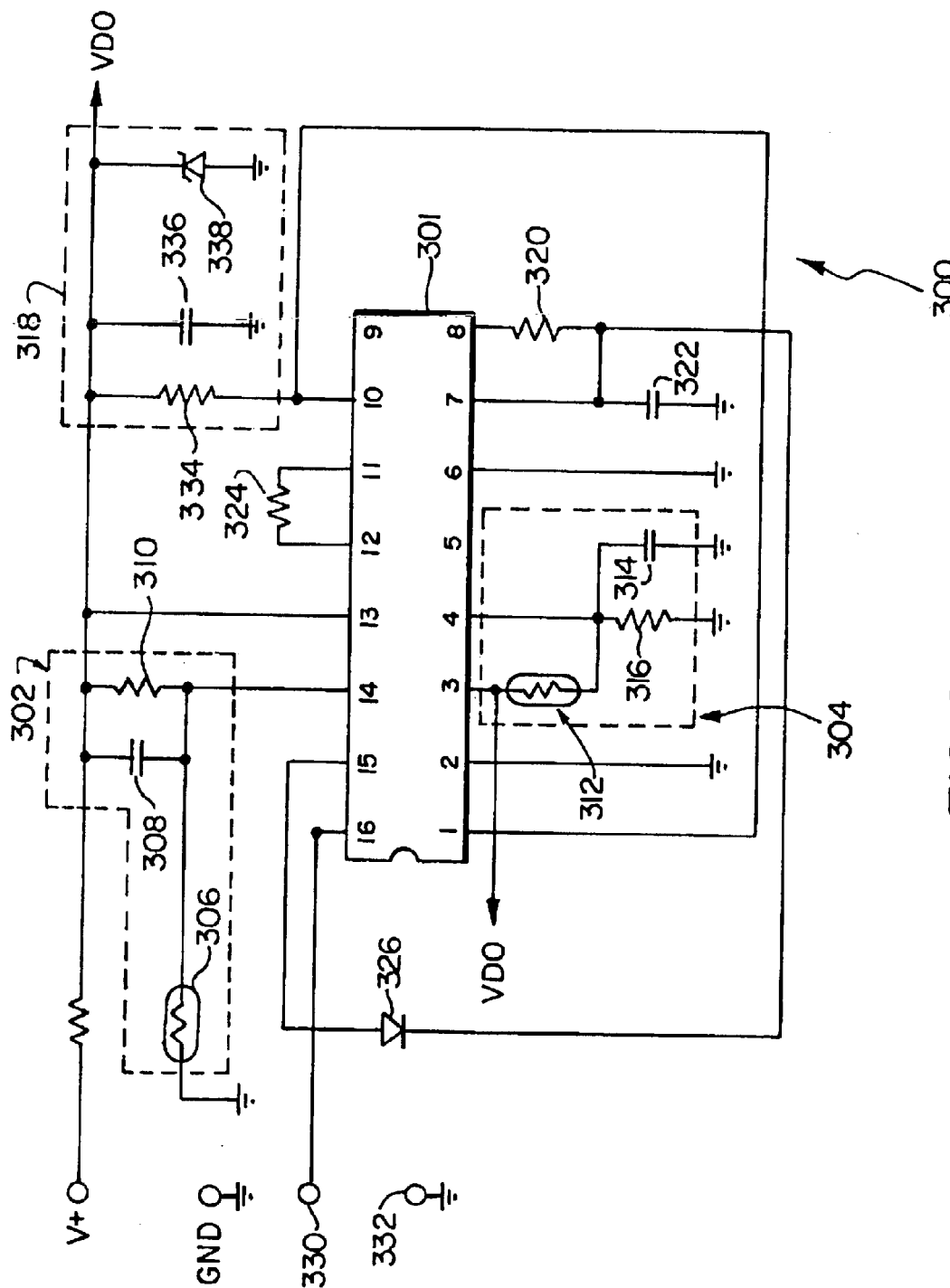
FIG. 5 is a circuit diagram of a preferred embodiment of the control circuit for the variable reflectance mirror of the present invention.

Referring now to FIG. 5, a detailed schematic of the control circuit 300 is illustrated. The control circuit 300 is preferably formed using a single CMOS stacked integrated circuit (IC) 301 which is packaged in a 16-pin dual in-line package (DIP), such as the CYT16181 IC chip manufactured by VTEC Technologies, Inc. This use of a CMOS stacked IC 301 provides an extremely compact control device that can be easily attached to the rear of the mirror 200. The ambient light detecting sensor 302 monitors the surrounding ambient light conditions and only allows the control circuit 300 to alter the reflectivity of the variable reflectance mirror 200 when the ambient light conditions are below a predefined threshold. When the ambient light conditions are greater than the predefined threshold, it is assumed that light impinging on the variable reflectance mirror 200 from the rear of the vehicle will not produce a glare effect to the driver of the vehicle and control of the variable reflectance mirror 200 is deactivated. The ambient light detecting sensor 302 includes a photosensor 306, a capacitor 308, and a resistor 310. The values of the capacitor 308 and the resistor 310 may be selected so as to set the independent value of the threshold for background ambient light to determine when to activate or deactivate the reflection dimming activity of the control circuit 300. The rear light detecting sensor 304 includes a photosensor 312, a capacitor 314, and a resistor 316. The values of the capacitor 314 and the resistor 316 may be selected to set a threshold value for when a sensed rear light is bright enough to cause to glare to the driver and to dim the reflectivity of the variable reflectance mirror 200 an appropriate amount. Based upon the intensity of the rear light sensed by the rear light detecting sensor 304, the control circuit 300 determines the amount of dimming required to compensate for the glare causing effect of the sensed rear light.

The control circuit 300 includes a voltage regulating circuit 318 which receives a voltage input (V+) from a voltage source on the vehicle and generates a fixed voltage source for the variable reflectance mirror 200. The voltage regulating circuit 318 includes a resistor 334, capacitor 336, and zenor diode 338. The voltage regulating circuit 318 may receive a voltage input (V+) from approximately 6 volts dc to approximately 40 volts dc, which enables the variable reflectance mirror 200 to be utilized on a wide variety of vehicles having various voltage sources. For instance, automobiles typically possess a 12 volt dc source while trucks typically possess a 36 volt dc voltage source. The voltage regulating circuit 318 converts the received voltage input (V+) to a voltage source used to drive the variable reflectance mirror 200, wherein the generated driving voltage for the variable reflectance mirror is in the range of approximately 2.7 to 5.5 volts dc. This enables the variable reflectance mirror 200 of the present invention to be entirely retrofittable in almost any existing vehicle, where only a voltage source from an existing power harness needs to be connected to the voltage regulating circuit 318. Furthermore, since the output of the voltage regulating circuit 318 may also be varied by varying the values its respective components, the control circuit 300 of the present invention is also capable of driving a plurality of different types of STN liquid crystal cells having various driving requirements.

The control circuit 300 sets the driving frequency of the STN liquid crystal cell 202 using a resistor 320/capacitor 322 pair. The driving frequency of the STN liquid crystal cell 202 may be adjusted between values of approximately 10 Hz to approximately 3 KHz by varying the value of the resistor 320. The stacked IC 301 also includes an oscillator circuit which sets the clock generation for the STN liquid crystal cell 200 by setting the values of resistor 324 and diode 326. The control circuit 300 is connected to the STN liquid crystal cell 200 through electrical leads 330 and 332 which are respectively connected to transparent electrodes 208 and 210. The control circuit 300 provides the necessary flexibility for the display operating frequency and operating voltage of user assigned specific display characteristics. Through this control, the present invention rejects the spot lighting projection of light energy impinging on the variable reflectance mirror 200 from the rear of the vehicle and independently monitors the background illumination around the mirror 200 for the purposes of attenuating the reflectivity of the mirror 200. The variable reflectance mirror 200 of the present invention maintains full attenuation of reflectivity and display characteristics in temperatures between approximately −10° C. and 90° C., which provides significantly improved display visibility over conventional liquid crystal mirrors.

As can be seen from the foregoing, a variable reflectance mirror formed in accordance with the present invention utilizes a STN liquid crystal cell to provide exceptional levels of reflectivity not achievable through the use of conventional TN liquid crystal materials. Further, the STN liquid crystal cell of the present invention provides a variable reflectance mirror having an improved viewing angle, higher contrast ratio, and an efficient response time within normal temperature fluctuations. Additionally, the STN liquid crystal cell of the present invention allows a rimless variable reflectance mirror to be produced by eliminating the need for large electrical contacts while achieving a quick and uniform response to changes in reflectivity throughout the mirror surface.

In each of the above embodiments, the different structures of the variable reflectance mirror are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A variable reflectance vehicle mirror which can be controlled to adjust reflectivity, comprising:

a front transparent polymer panel;

an outer anti-abrasion surface coating of an organo-silicone polymer on an outer surface of the front transparent polymer panel;

a first polarization filter adhered to an inside surface of the front panel;

a super twisted nematic (STN) liquid crystal cell connected to the first polarization filter;

a second polarization filter connected to a rear of the STN liquid crystal cell;

a layer of metallic reflective material adhered to a rear surface of the second polarization filter;

a rear panel bonded to the reflective material layer, the layer of metallic reflective material enables a reflectance of greater than 90% when incident light is not attenuated by the STN liquid crystal cell; and a control circuit connected to said STN liquid crystal cell for controlling the birefringence of the STN liquid crystal cell to adjust the degree of reflection of the mirror, wherein the STN liquid crystal cell can provide a contrast ratio of 480:1.

2. The variable reflectance vehicle mirror of claim 1 further including a hydrophilic coating of Zirconia and Silicon Dioxide on the front transparent polymer panel.

3. The variable reflectance vehicle mirror of claim 1, wherein said control circuit is formed as a stacked IC with an oscillator formed within the stacked IC for variably adjusting a driving frequency applied to the STN liquid crystal cell; and a first photo sensor for detecting an intensity of a glare-causing light impinging upon said first photo sensor and providing a signal indicative of the intensity of the light detected, said control circuit being connected to said first photo sensor for receiving the signal indicative of the intensity of the light detected and applying a bias voltage to said STN liquid crystal cell accordingly to control the degree of reflectivity of the mirror; and a second photo sensor for detecting ambient light levels and providing a signal indicating when the intensity of the ambient light detected is greater than a threshold value, said control circuit being connected to said second photo sensor for receiving the signal indicative of the intensity of the ambient light detected being greater than the threshold value so that said control circuit disables the effect of the first photo sensor in controlling the degree of reflectivity of the mirror when the ambient light detected is greater than the threshold value, wherein said first and second photo sensors are directly attached to a housing for the vehicle mirror.

4. The variable reflectance vehicle minor of claim 3 wherein said control circuit further includes a voltage regulator capable of receiving a source of power from a vehicle of 40 volts d.c. and generating a bias voltage to be applied to said STN liquid crystal cell between approximately 2.7 to 5.5 volts d.c.

* * * * *